(12) United States Patent
Paliwal et al.

(10) Patent No.: US 12,546,823 B2
(45) Date of Patent: Feb. 10, 2026

(54) SYSTEM AND METHOD FOR DEVELOPING AND DEBUGGING A SILICON PRODUCTION TEST PROGRAM FOR SEMICONDUCTOR DEVICES

(71) Applicant: SILICONCH SYSTEMS PVT LTD, Karnataka (IN)

(72) Inventors: Shubham Paliwal, Kanpur (IN); Rakesh Kumar Polasa, Bengaluru (IN); Burle Naga Satyanarayana, Andhra Pradesh (IN); Satish Anand Verkila, Bengaluru (IN); Alagesan Mani, Tamil Nadu (IN)

(73) Assignee: SILICONCH SYSTEMS PVT LTD, Bangalore (IN)

( * ) Notice: Subject to any disclaimer, the term of this patent is extended or adjusted under 35 U.S.C. 154(b) by 0 days.

(21) Appl. No.: 18/733,701

(22) Filed: Jun. 4, 2024

(65) Prior Publication Data

US 2025/0321271 A1    Oct. 16, 2025

(30) Foreign Application Priority Data

Apr. 12, 2024  (IN) ............................. 202441029853

(51) Int. Cl.
*G01R 31/3183* (2006.01)
*G01R 31/28* (2006.01)

(52) U.S. Cl.
CPC . *G01R 31/318314* (2013.01); *G01R 31/2834* (2013.01); *G01R 31/2849* (2013.01)

(58) Field of Classification Search
CPC ............ G01R 31/2834; G01R 31/2849; G01R 31/318314

(Continued)

(56) References Cited

U.S. PATENT DOCUMENTS 8,397,188 B1 *   3/2013  Scheidt .................. G06F 30/33
                                                                714/724
2002/0173942 A1 * 11/2002  Rajsuman ...... G01R 31/318357
                                                                703/14

(Continued)

OTHER PUBLICATIONS

Universal Serial Bus Type-C Cable and Connector Specification Release 2.0, USB 3.0 Promoter Group, Aug. 2019 (373 pages).

(Continued)

*Primary Examiner* — Albert Decady
*Assistant Examiner* — Enam Ahmed
(74) *Attorney, Agent, or Firm* — Procopio, Cory, Hargreaves & Savitch LLP (57) ABSTRACT

The present disclosure relates to a method and a system for creating and debugging a silicon production test program for a semiconductor device. The method includes running a pre-silicon test program for testing a semiconductor device under test based on a plurality of test plan parameters. The method includes converting the pre-silicon test program from a hardware description language to a high-level programming language in response to determining that the pre-silicon test program is created in the hardware description language. The method includes integrating the pre-silicon test program with a bench board test program or an automated test equipment (ATE) test program, and mapping Application Programming Interface (API) resources available in the pre-silicon test program to one or more resources available in the bench board test program or the ATE test program during integration. The method includes testing and debugging the semiconductor device under test using an emulation platform.

17 Claims, 4 Drawing Sheets

(58) Field of Classification Search
USPC .......................................................... 714/724
See application file for complete search history.

(56) References Cited

U.S. PATENT DOCUMENTS

| | | | | |
|---|---|---|---|---|
| 2007/0252616 | A1* | 11/2007 | Balasubramanian | ........................ H03K 17/223 326/38 |
| 2013/0227367 | A1* | 8/2013 | Czamara | ............ G01R 31/2834 714/735 |
| 2014/0149811 | A1* | 5/2014 | Ross | .................. G01R 31/2882 714/724 |
| 2023/0252233 | A1* | 8/2023 | Gutierrez | ................ G06F 40/40 704/9 |
| 2023/0353508 | A1* | 11/2023 | Sood | ..................... H04L 47/626 |

OTHER PUBLICATIONS

Universal Serial Bus Power Delivery Specification, Revision 3.0, Version 2.0, Aug. 29, 2019 (657 pages).

* cited by examiner

SYSTEM AND METHOD FOR DEVELOPING AND DEBUGGING A SILICON PRODUCTION TEST PROGRAM FOR SEMICONDUCTOR DEVICES

CROSS REFERENCE TO RELATED APPLICATIONS

The present application is based on and claims priority from Indian Patent Application number 202441029853, filed on Apr. 12, 2024, the entire content of which is incorporated herein by reference.

TECHNICAL FIELD

The present disclosure relates generally to semiconductor devices. In particular, the present disclosure relates to a method and a system for creating and debugging a silicon production test program for semiconductor devices using a pre-silicon test program.

BACKGROUND

Background description includes information that may be useful in understanding the present disclosure. It is not an admission that any of the information provided herein is prior art or relevant to the presently claimed disclosure, or that any publication specifically or implicitly referenced is prior art.

In current technologies, when test programs are applied to semiconductor devices after manufacturing, there may be errors and issues related to debugging. These errors may lead to delays in products launch, potentially reducing a life cycle of semiconductor-based products developed using semiconductors technologies.

Many techniques have been evolved to obviate the above-mentioned issues, for instance, one such prior art describes a reconfigurable test system configured to seamlessly integrate automated testing of semiconductor devices between a pre-silicon simulation test phase, a post-silicon validation test phase, and a production test phase. The reconfigurable test system includes a tester instrument connected to a plurality of pins of a semiconductor device under test (DUT), said tester instrument includes one or more Field Programmable Gate Arrays (FPGAs), for use in the three phases of testing. The said tester instrument includes one or more interface circuits configured to compare time-stamped transactions out of the pins to an expected response. A graphical user interface debug tool is configured to graphically display the stored time-stamped pin-level transactions for each pin of the semiconductor DUT, both into and out of the DUT, to help debug test cases and DUT errors. The said debug tool is further configured to graphically display the transactions into and out of the DUT in a scoreboard format. However, the reconfigurable test system may not test and debug the DUT at a reduced time.

Figure 1:
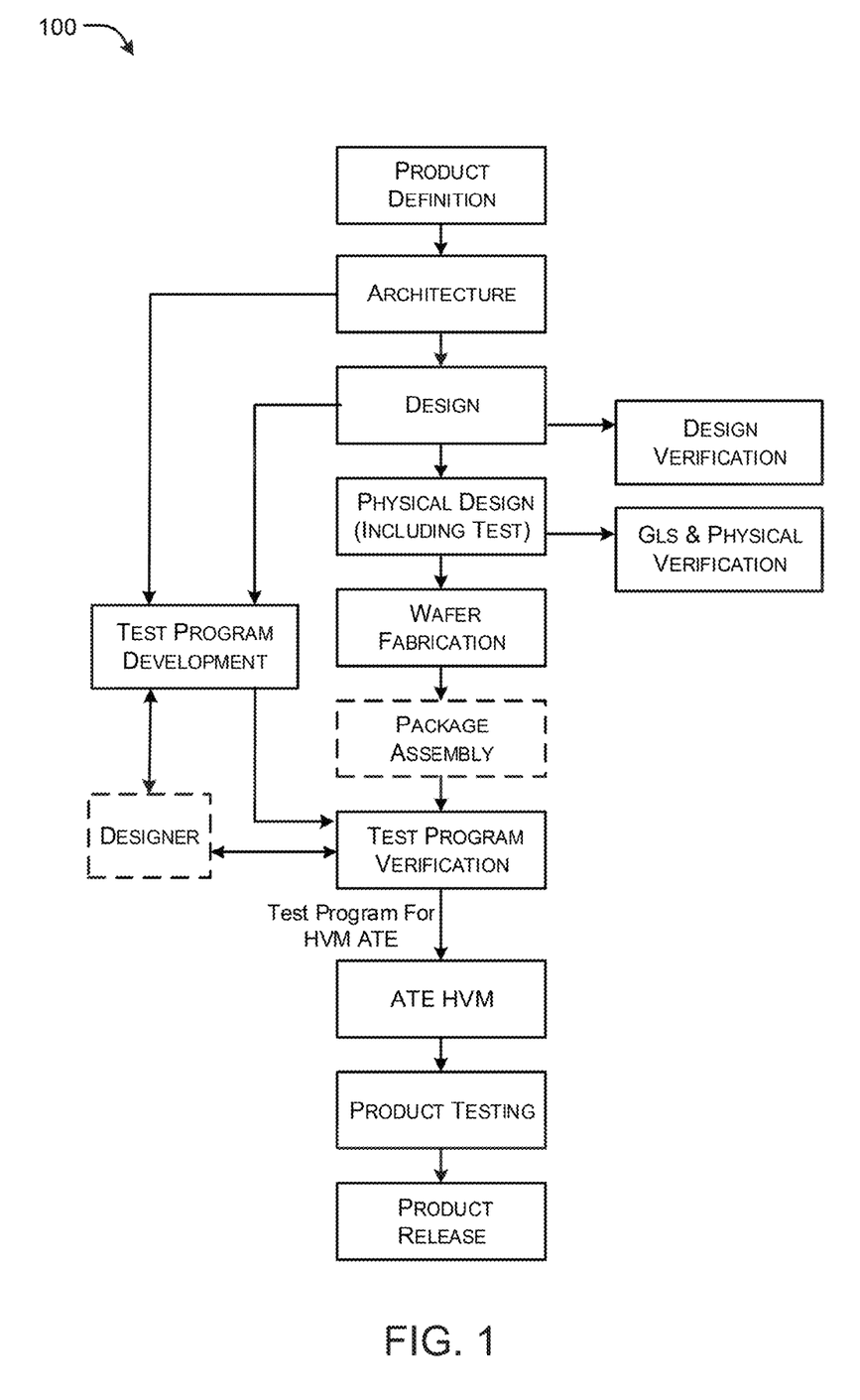
FIG. 1 illustrates a flow chart depicting a conventional design/process flow prior to a bench board system.

Further, a conventional design/process flow prior to a bench board system is illustrated in FIG. 1. The bench board system may be a test board or an evaluation board used for testing semiconductor devices or circuits. The conventional design/process flow may involve steps including product definition, product design, design verification and validation, test program development, wafer fabrication, test program verification, development of Automated Test Equipment (ATE) test program, product testing, and product release. However, in the conventional design/process flow, the test programs may be applied on post-silicon manufacturing necessitating iterative cycles between a designer and a final high-volume manufacturing (HVM) test program development and test program verification, potentially resulting in errors, including debugging, during the product launch.

Therefore, there is a need for an improved system and a method for creating and debugging a silicon production test program for the semiconductor devices by overcoming the deficiencies of the prior art.

OBJECTS OF THE PRESENT DISCLOSURE

Some of the objects of the present disclosure, which at least one embodiment herein satisfies are listed herein below.

An object of the present disclosure is to provide a system and a method for efficiently creating and debugging a silicon production test program for semiconductor devices using a pre-silicon test program.

Another object of the present disclosure is to convert the pre-silicon test program from a hardware description language to a high-level programming language when the pre-silicon test program is created in the hardware description language.

Another object of the present disclosure is to integrate the pre-silicon test program in the high-level programming language with a bench board test program and/or an automated test equipment (ATE) test program.

Another object of the present disclosure is to map Application Programming Interface (API) resources available in the pre-silicon test program to one or more resources available in the bench board test program or the ATE test program.

Yet another object of the present disclosure is to test and debug the semiconductor device under test using an emulation platform at reduced time.

The other objects and advantages of the present invention will be apparent from the following description when read in conjunction with the accompanying drawings, which are incorporated for illustration of the preferred embodiments of the present invention and are not intended to limit the scope thereof.

SUMMARY

Aspects of the present disclosure relate generally to semiconductor devices. In particular, the present disclosure relates to a method and a system for creating and debugging a silicon production test program for semiconductor devices using a pre-silicon test program.

In an aspect, the present disclosure relates to a method for creating and debugging a silicon production test program for a semiconductor device. The method includes running, by a Micro Controller Unit (MCU), a pre-silicon test program for testing a semiconductor device under test based on a plurality of test plan parameters, where the pre-silicon test program is created in at least one of a hardware description language and a high-level programming language, and tested and validated during a pre-silicon design and verification phase using simulations. The method includes converting the pre-silicon test program from the hardware description language to the high-level programming language in response to determining that the pre-silicon test program is created in the hardware description language. The method includes abstracting the implementation specific Application Programming Interface (API) resources/method and making the pre-silicon test program in the high-level programming language to be portable with at least one of a bench board test program and an automated test equipment (ATE) test program. The method includes mapping API resources available in the pre-silicon test program to one or more resources available in the bench board test program or the ATE test program during integration. Further, the method includes testing and debugging the semiconductor device under test using an emulation platform in response to completion of mapping of the API resources using the bench board test program or the ATE test program.

In an embodiment, the plurality of test plan parameters may include one or more electrical parameters identified during architecture phase and captured in a test specification compliance document or matrix.

In an embodiment, the method may include running, by the processor, a characterization program for evaluating a performance and a quality of the semiconductor device under test, and performing stress test on the semiconductor device under test.

In an embodiment, the running, by the processor, the pre-silicon test program for testing the semiconductor device under test may include employing, by the processor, at least one testing platform, where the at least one testing platform may include at least one of an ATE platform and a bench platform.

In an embodiment, in response to the running of the pre-silicon test program, the method may include evaluating the pre-silicon test program based on the plurality of test plan parameters including the one or more electrical parameters.

In an embodiment, the testing and debugging of the semiconductor device under test may include validating the semiconductor device under test using the emulation platform.

In an embodiment, the method may include optimizing the pre-silicon test program with the bench board test program and the semiconductor device under test for reducing production test times and incorporating response times of the plurality of test plan parameters.

In an aspect, the present disclosure relates to a system for creating and debugging a pre-silicon test program for a semiconductor device. The system includes a processor, and a memory operatively coupled to the processor. The memory includes processor-executable instructions which, when executed by the processor, cause the processor to run a pre-silicon test program for testing a semiconductor device under test based on a plurality of test plan parameters, where the pre-silicon test program is created in at least one of a hardware description language and a high-level programming language, and tested and validated during a design and verification phase using simulations. The processor converts the pre-silicon test program from the hardware description language to the high-level programming language in response to determining that the pre-silicon test program is created in the hardware description language. The processor integrates the pre-silicon test program in the high-level programming language with at least one of a bench board test program and an ATE test program. The processor maps one or more API resources available in the pre-silicon test program to one or more resources available in the bench board test program or the ATE test program during integration. The processor tests and debugs the semiconductor device under test using an emulation platform in response to completion of mapping of the API resources using the bench board test program or the ATE test program.

In an embodiment, the system may include a Field Programmable Gate Array (FPGA) operatively coupled to the processor for high-speed implementation and interfacing to one or more force blocks and one or more sense blocks.

In an embodiment, the one or more force blocks may be coupled to the MCU with or without using the FPGA, and controlled for forcing at least one of a voltage source, a resistance, a capacitance, or a current source on one or more pins of the semiconductor device under test using one or more relay switches.

In an embodiment, the one or more sense blocks may be coupled to the MCU with or without using the FPGA, and controlled for sensing an output on the one or more pins of the semiconductor device under test using the one or more relay switches. The sensing may be performed through at least one of an Analog-to-Digital Converter (ADC), one or more sensors, and one or more circuits using discrete components for sensing of voltage, current, frequency, time period and temperature.

In an embodiment, the one or more relay switches may be operatively coupled to the one or more force blocks and the one or more sense blocks for connecting to the semiconductor device under test.

In an embodiment, the memory includes MCU-executable instructions which, when executed by the MCU, may cause the MCU to run a characterization program for evaluating a performance and a quality of the semiconductor device under test, and perform stress test on the semiconductor device under test using the FPGA, the one or more force blocks, the one or more sense blocks, and one or more relay switches operatively coupled to the MCU.

In an embodiment, the MCU may run the pre-silicon test program in the high-level programming language for testing the semiconductor device under test by being configured to employ at least one testing platform, where the at least one testing platform may include at least one of an ATE platform and a bench platform.

In an embodiment, in response to the running of the pre-silicon test program, the MCU may evaluate the pre-silicon test program based on the plurality of test plan parameters including one or more electrical parameters.

In an embodiment, the MCU may test and debug the semiconductor device under test by being configured to validate the semiconductor device under test using the emulation platform.

In an embodiment, the memory includes MCU-executable instructions which, when executed by the MCU, may cause the MCU to optimize the pre-silicon test program in the high-level programming language with the bench board test program and the semiconductor device under test using the FPGA, the one or more force blocks, the one or more sense blocks, and one or more relay switches operatively coupled to the MCU.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The following drawings form part of the present specification and are included to further illustrate aspects of the present disclosure. The disclosure may be better understood by reference to the drawings in combination with the detailed description of the specific embodiments presented herein.

DETAILED DESCRIPTION

The following is a detailed description of embodiments of the disclosure depicted in the accompanying drawings. The embodiments are in such detail as to clearly communicate the disclosure. If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The present disclosure relates generally to semiconductor devices. In particular, the present disclosure relates to a method and a system for creating and debugging a silicon production test program for semiconductor devices using a pre-silicon test program.

In an aspect, the present disclosure relates to a method for creating and debugging a silicon production test program for a semiconductor device. The method includes running, by a MCU, a pre-silicon test program for testing a semiconductor device under test based on a plurality of test plan parameters, where the pre-silicon test program is created in at least one of a hardware description language and a high-level programming language, and tested and validated during a pre-silicon design and verification phase using simulations. The method includes converting the pre-silicon test program from the hardware description language to the high-level programming language in response to determining that the pre-silicon test program is created in the hardware description language. The method includes integrating the pre-silicon test program in the high-level programming language with at least one of a bench board test program and an automated test equipment (ATE) test program. The method includes mapping one or more Application Programming Interface (API) resources available in the pre-silicon test program to one or more resources available in the bench board test program or the ATE test program during integration. Further, the method includes testing and debugging the semiconductor device under test using an emulation platform in response to completion of mapping of the API resources using the bench board test program or the ATE test program.

In an aspect, the present disclosure relates to a system for creating and debugging a pre-silicon test program for a semiconductor device. The system includes an MCU, and a memory operatively coupled to the MCU. The memory includes MCU-executable instructions which, when executed by the MCU, cause the MCU to run a pre-silicon test program for testing a semiconductor device under test based on a plurality of test plan parameters, where the pre-silicon test program is created in at least one of a hardware description language and a high-level programming language, and tested and validated during a design and verification phase using simulations. The MCU converts the pre-silicon test program from the hardware description language to the high-level programming language in response to determining that the pre-silicon test program is created in the hardware description language. The MCU integrates the pre-silicon test program in the high-level programming language with at least one of a bench board test program and an ATE test program. The MCU maps one or more API resources available in the pre-silicon test program to one or more resources available in the bench board test program or the ATE test program during integration. The MCU tests and debugs the semiconductor device under test using an emulation platform in response to completion of mapping of the API resources using the bench board test program or the ATE test program.

The description of terms and features related to the present disclosure shall be clear from the embodiments that are illustrated and described; however, the present disclosure is not limited to these embodiments only. Numerous modifications, changes, variations, substitutions, and equivalents of the embodiments are possible within the scope of the present disclosure. Additionally, the present disclosure can include other embodiments that are within the scope of the claims but are not described in detail with respect to the following description.

Various embodiments of the present disclosure will be explained in detail with reference to FIGS. 2-4.

Figure 2:
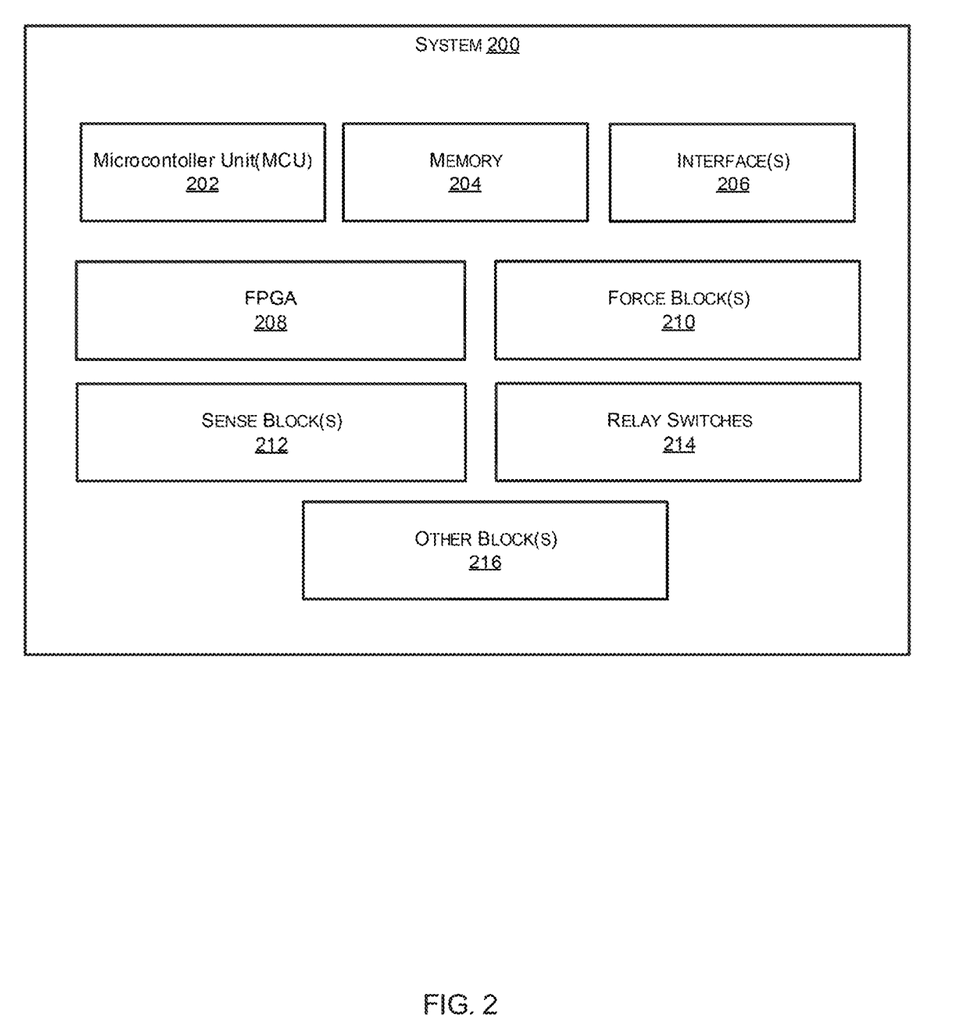
FIG. 2 illustrates an example block diagram of a system for creating and debugging a pre-silicon test program for a semiconductor device, in accordance with an embodiment of the present disclosure.

FIG. 2 illustrates an example block diagram of a system (200) for creating and debugging a pre-silicon test program for a semiconductor device, in accordance with an embodiment of the present disclosure.

With reference to FIG. 2, the system (200) may include one or more MCU(s) (202). The one or more MCU(s) (202) may be implemented as one or more processors, microcomputers, microcontrollers, edge or fog microcontrollers, digital signal MCUs, central processing units, logic circuitries, and/or any devices that process data based on operational instructions. Among other capabilities, the one or more MCU(s) (202) may be configured to fetch and execute computer-readable instructions stored in a memory (204) of the system (200). The memory (204) may be configured to store one or more computer-readable instructions or routines in a non-transitory computer-readable storage medium, which may be fetched and executed to create or share data packets over a network service. The memory (204) may comprise any non-transitory storage device including, for example, volatile memory such as a Random-Access Memory (RAM), or a non-volatile memory such as an Erasable Programmable Read-Only Memory (EPROM), a flash memory, and the like.

In an embodiment, the system (200) may include an interface(s) (206). The interface(s) (206) may include a variety of interfaces, for example, interfaces for data input and output devices, referred to as I/O devices, storage devices, and the like. The interface(s) (206) may facilitate communication of the system (200). The interface(s) (206) may also provide a communication pathway for one or more components of the system (200).

In an embodiment, the system (200) may include Field Programmable Gate Arrays (FPGAs) (208). The FPGAs (208) are programmable and reconfigurable devices, and operatively coupled to the one or more MCU(s) (202) for high-speed implementation and interfacing to one or more force blocks (210) and one or more sense blocks (212).

In an embodiment, the one or more force blocks (210) may be coupled to the one or more MCU(s) (202) with the FPGA (208). In an embodiment, the one or more force blocks (210) may be coupled to the one or more MCU(s) (202) without using the FPGA (208). In an embodiment, the one or more force blocks (210) may be controlled for forcing a voltage source, a resistance, a capacitance, or a current source on one or more pins of a semiconductor device under test using one or more relay switches (214). The semiconductor device under test may be, for example, but are not limited to, Integrated Circuits (ICs), transistors, diodes, memory devices, optoelectronic devices, power devices, and so on. In an embodiment, the one or more relay switches (214) may be operatively coupled to the one or more force blocks (210) and the one or more sense blocks (212) for connecting to the semiconductor device under test.

In an embodiment, the one or more sense blocks (212) may be coupled to the one or more MCU(s) (202) with the FPGA (208). In an embodiment, the one or more sense blocks (212) may be coupled to the one or more MCU(s) (202) without using the FPGA (208). In an embodiment, the one or more sense blocks (212) may be controlled for sensing an output on the one or more pins of the semiconductor device under test using the one or more relay switches (214). The sensing of the output on the one or more pins of the semiconductor device under test may be performed through an Analog-to-Digital Converter (ADC), one or more sensors, and one or more circuits using discrete components for sensing.

In an embodiment, the one or more MCU(s) (202) may create a pre-silicon test program in a hardware description language and/or a high-level programming language. The hardware description language may be, for example, Verilog, System Verilog, and the high-level programming language may be, for example, C/C++ programming language. The one or more MCU(s) (202) may test and validate the pre-silicon test program during a design and verification phase using simulations. The pre-silicon test program may be executed for testing the semiconductor device under test based on a plurality of test plan parameters. The plurality of test plan parameters may include one or more electrical parameters identified during the architecture phase and captured in a test specification compliance document or matrix. The one or more electrical parameters may include, but are not limited to, a voltage level, a current level, power consumption, impedance matching, temperature range, propagation delay, setup time, hold time, frequency of the signal, and the like. The pre-silicon test program may be executed by employing a testing platform. The testing platform may be, for example, an ATE platform and a bench platform. In response to executing the pre-silicon test program, the one or more MCU(s) (202) may evaluate the pre-silicon test program based on the plurality of test plan parameters.

In an embodiment, the one or more MCU(s) (202) may determine if the pre-silicon test program is created in the hardware description language or the high-level programming language. In response to determining that the pre-silicon test program is created in the hardware description language, the one or more MCU(s) (202) may convert the pre-silicon test program from the hardware description language to the high-level programming language.

In an embodiment, the one or more MCU(s) (202) may integrate the pre-silicon test program in the high-level programming language with a bench board test program and/or an ATE test program. In an embodiment, the one or more MCU(s) (202) may map one or more API resources available in the pre-silicon test program to one or more resources available in the bench board test program or the ATE test program during integration, thereby making the bench board test program or the ATE test program portable across the testing platforms. In an embodiment, the one or more MCU(s) (202) may abstract the implementation specific API resources/method and make the pre-silicon test program in the high-level programming language to be portable with the bench board test program or the ATE test program.

In an embodiment, the one or more MCU(s) (202) may test and debug the semiconductor device under test using an emulation platform in response to completion of mapping of the API resources using the bench board test program or the ATE test program. The emulation platform may provide a flexible and cost-effective way to test and debug the semiconductor device under test, enabling developers to identify and fix issues early in the development process of the semiconductor device. In an embodiment, the one or more MCU(s) (202) may test and debug the semiconductor device under test by validating the semiconductor device under test using the emulation platform.

In an embodiment, the one or more MCU(s) (202) may optimize the pre-silicon test program in the high-level programming language with the bench board test program and the semiconductor device under test using the FPGA (208), the one or more force blocks (210), the one or more sense blocks (212), and the one or more relay switches (214) operatively coupled to the one or more MCU(s) (202).

In an embodiment, the one or more MCU(s) (202) may run a characterization program for evaluating a performance and a quality of the semiconductor device under test. In an embodiment, the one or more MCU(s) (202) may perform a stress test on the semiconductor device under test using the FPGA (208), the one or more force blocks (210), the one or more sense blocks (212), and the one or more relay switches (214). The stress test may be a type of test that evaluates the performance of the semiconductor device under test under extreme or adverse conditions. The stress test may be performed to determine reliability and robustness of the semiconductor device under test by subjecting it to conditions that exceed normal operating parameters. This may help in identifying potential failure modes and weaknesses in the design or manufacturing process of a semiconductor device.

Although FIG. 2 shows an exemplary block diagram of the system (200), in other embodiments, the system (200) may include fewer components, different components, differently arranged components, or additional functional components than depicted in FIG. 2. Additionally, or alternatively, one or more components of the system (200) may perform functions described as being performed by one or more other components of the system (200).

Figure 3:
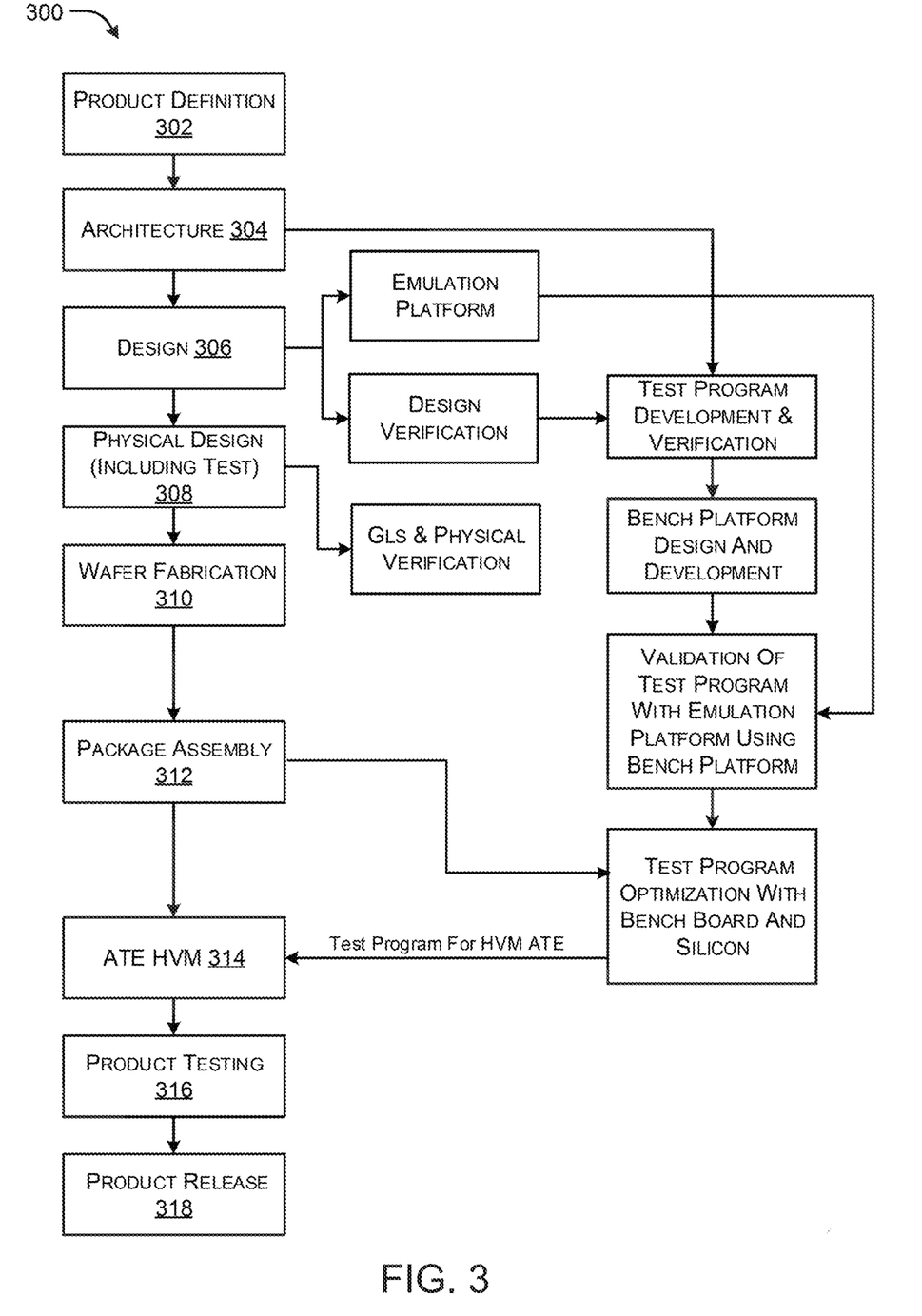
FIG. 3 illustrates a flow chart depicting a design/process flow after a bench board system, in accordance with an embodiment of the present disclosure.

FIG. 3 illustrates a flow chart (300) depicting a design/process flow after a bench board system, in accordance with an embodiment of the present disclosure.

The semiconductor device may be developed and launched by involving different steps, as illustrated in FIG. 3. At step 302, during semiconductor device development, defining a product involves specifying key characteristics and features of the semiconductor device. This process may be crucial for ensuring that the semiconductor device meets the requirements of its intended application. The product definition in the semiconductor device development may include, but are not limited to, functional specifications, performance specifications, physical specifications, cost and manufacturing considerations, and the like.

At step 304, an architecture may refer to an overall design and organization of the semiconductor device. The architecture may encompass a high-level structure, functionality, and interconnections of various components that make up the semiconductor device. The architecture of the semiconductor device is critical as it defines how the device will function and how it will meet its performance, power, and cost requirements. The architecture may include a pre-silicon test program development and verification process, a bench platform design and development process, validation of the pre-silicon test program, the pre-silicon test program optimization, and a test program for Automated Test Equipment (ATE) used in High Volume Manufacturing (HVM) environments.

The pre-silicon test program development and verification process may involve creating the pre-silicon test program in the hardware description language and/or the high-level programming language. The pre-silicon test program may be converted from the hardware description language to the high-level programming language if the pre-silicon test program is created in the hardware description language. Further, the pre-silicon test program may be verified, tested, and validated during a design and verification phase using simulations.

The bench platform design and development process may include designing and developing a bench board test program. The pre-silicon test program in the high-level programming language may be with the bench board test program and/or the ATE test program. During integration, one or more API resources available in the pre-silicon test program may be mapped to one or more resources available in the bench board test program or the ATE test program.

The validation of the pre-silicon test program may include validating the pre-silicon test program with the emulation platform using the bench platform and/or the bench board test program.

The pre-silicon test program optimization may include optimizing the pre-silicon test program with the bench board test program and the semiconductor device under test for reducing production test times and incorporating response times of the plurality of test plan parameters.

At step 306, designing of the semiconductor device may include developing the emulation platform and the design verification process. The emulation platform may be developed to test and debug the semiconductor device, and enable the developers to identify and fix issues early in the development process of the semiconductor device. The design verification process may include development and verification of the pre-silicon test program, design and development of the bench platform, validation of the pre-silicon test program with the emulation platform, and optimization of the pre-silicon test program.

At step 308, a physical design of the semiconductor device may involve a layout and implementation of the device's components at a physical level. The physical design may translate the device's logical design into a physical layout that can be manufactured. The steps involved in the physical design of the semiconductor device may include, but not limited to, determining an overall layout of the semiconductor device, determining a precise location of each component on the semiconductor device, designing a power grid on the semiconductor device to ensure that all components receive an adequate and stable power supply, checking the layout against design rules to ensure that it meets manufacturing requirements, optimizing the layout to improve manufacturability and yield, and the like.

At step 310, wafer fabrication, also known as a semiconductor manufacturing or semiconductor fabrication, is a process of creating, for example, ICs on a silicon wafer. This process involves several steps including, but not limited to, wafer preparation, cleaning of wafers to remove contaminants, photolithography, etching to remove material from the wafer where a circuit pattern is not desired, metallization to create the metal interconnects that connect the different components of the IC, and testing of the wafers to ensure that the ICs meet the required specifications.

At step 312, a package assembly, also known as a semiconductor packaging or an IC packaging, is a process of enclosing and protecting the IC in a package that provides electrical connections and mechanical support. This process may be essential for making the ICs usable in electronic devices. A test program verification process may be performed to ensure that the test programs, for example, the pre-silicon test program used to test the semiconductor devices are accurate, reliable, and effective. The test program verification process may be performed to ensure that the test programs correctly identify any defects or issues in the semiconductor devices being tested. The package assembly and the test program verification process may be performed simultaneously to reduce iterative cycles between a designer and a final high-volume manufacturing (HVM) test program development.

At step 314, ATE HVM refers to a use of automated test equipment in high-volume manufacturing settings to test and validate the semiconductor devices in large quantities. This may help in ensuring that only quality products are shipped to customers, while also reducing production costs and improving overall efficiency of the semiconductor devices.

At step 316, product testing may be performed in the development and manufacturing of the products to ensure that they meet quality, performance, and safety standards. It involves subjecting the product to various tests and evaluations to assess its functionality, durability, and compliance with regulations.

At step 318, the product release process may involve launching the product to market successfully. It requires careful planning, execution, and monitoring to ensure that the product meets customer expectations and achieves business objectives.

Figure 4:
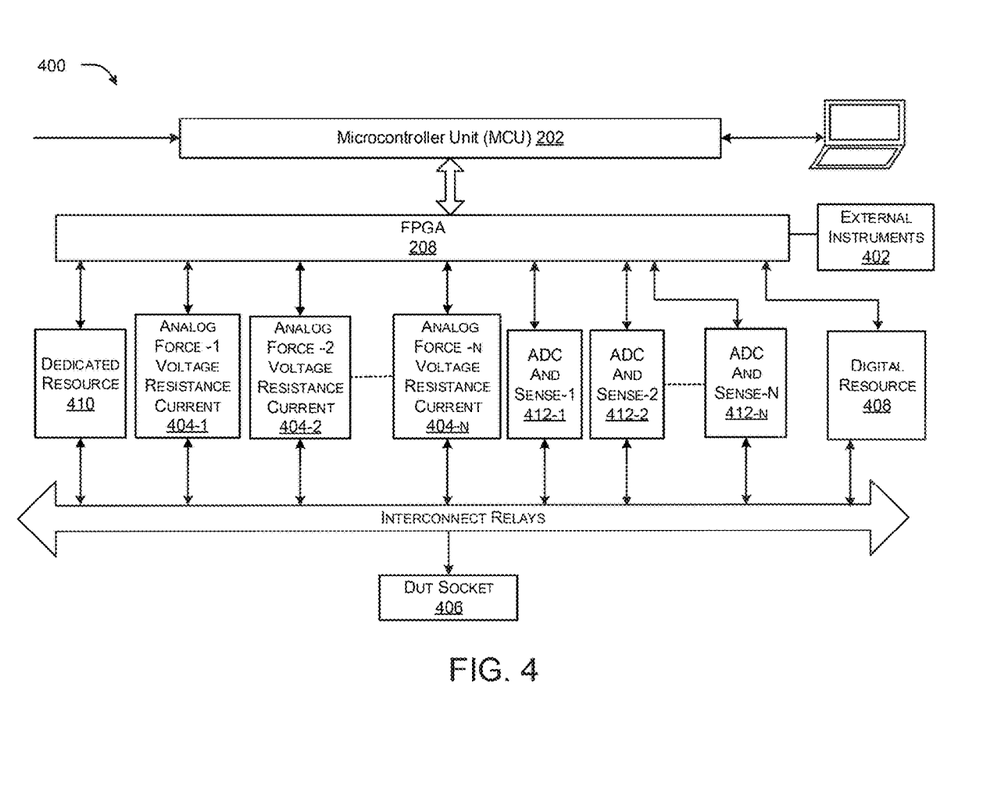
FIG. 4 illustrates an example representation of a bench board system, in accordance with an embodiment of the present disclosure.

FIG. 4 illustrates an example representation of a bench board system, in accordance with an embodiment of the present disclosure.

With reference to FIG. 4, the bench board system may include external analog resources (402), internal analog resources (404-1, 404-2, . . . 404-*n*), a switch network semiconductor device under test socket(s) (406), internal digital resources (408), Analog to Digital Converters (ADCs) (412-1, 412-2, . . . 412-*n*) and a dedicated resource (410). The external analog resources (402) may be external components or devices that provide analog signals or resources to the bench board system. Examples include, but not limited to, signal generators, oscilloscopes, and function generators that are connected to the bench board system to provide or measure analog signals.

It may be appreciated that the internal analog resources (404-1, 404-2, . . . 404-*n*) may be collectively referred to as the internal analog resources (404), and individually referred to as the internal analog resource (404). The internal analog resources (404) may be internal components or resources within the bench board system that are used for generating or processing the analog signals. This may include analog-to-digital converters (ADCs), digital-to-analog converters (DACs), or analog signal processing circuits.

The switch network semiconductor device under test socket(s) (406) may be a socket or an interface on the bench board system used for connecting and testing the semiconductor devices (such as integrated circuits or chips). The switch network may allow for routing signals to and from the device under test to the rest of the bench board system for testing and evaluation.

The internal digital resources (408) may be internal components or resources within the bench board system that are used for generating or processing digital signals. This may include digital signal processors (DSPs), microcontrollers (MCU), or digital logic circuits.

It will be apparent to those skilled in the art that the structure of the disclosure may be provided using some or all of the mentioned features and components without departing from the scope of the present disclosure. While various embodiments of the present disclosure have been illustrated and described herein, it will be clear that the disclosure is not limited to these embodiments only. Numerous modifications, changes, variations, substitutions, and equivalents will be apparent to those skilled in the art, without departing from the spirit and scope of the disclosure, as described in the claims.

Advantages of the Present Invention

The present disclosure provides a system and a method for efficiently creating and debugging a silicon production test program for semiconductor devices using a pre-silicon test program.

The present disclosure converts the pre-silicon test program from a hardware description language to a high-level programming language when the pre-silicon test program is created in the hardware description language.

The present disclosure integrates the pre-silicon test program in the high-level programming language with a bench board test program and/or an automated test equipment (ATE) test program.

The present disclosure tests and debugs the semiconductor device under test using an emulation platform in effective manner.

The present disclosure reduces the time involved in performing debugging and testing process upon post-silicon technology.

The present disclosure ensures reduction in a time-to-market of a semiconductor device.

The present disclosure ensures that there is sufficient feedback for semiconductor testing in High Volume Manufacturing (HVM) very early in a design flow.

We claim:

1. A method for creating and debugging a silicon production test program for a semiconductor device, comprising:
    running, by a Micro Controller Unit (MCU), a pre-silicon test program for testing a semiconductor device under test based on a plurality of test plan parameters, wherein the pre-silicon test program is created in at least one of a hardware description language or a high-level programming language, and is tested and validated during a pre-silicon design and verification phase using simulations;
    converting, by the MCU, the pre-silicon test program from the hardware description language to the high-level programming language in response to determining that the pre-silicon test program is created in the hardware description language;
    integrating, by the MCU, the pre-silicon test program in the high-level programming language with at least one of a bench board test program or an automated test equipment (ATE) test program;
    mapping, by the MCU, one or more Application Programming Interface (API) resources available in the pre-silicon test program to one or more resources available in the bench board test program or the ATE test program during integration, wherein the mapping abstracts implementation specific API resources and methods to make the pre-silicon test program portable across testing platforms; and
    testing and debugging, by the MCU, the semiconductor device under test using an emulation platform in response to completion of mapping of the API resources using the bench board test program or the ATE test program.

2. The method as claimed in claim 1, wherein the plurality of test plan parameters comprises one or more electrical parameters identified during an architecture phase and captured in a test specification compliance document or matrix.

3. The method as claimed in claim 1, comprising running, by the MCU, a characterization program for evaluating a performance and a quality of the semiconductor device under test, and performing stress test on the semiconductor device under test.

4. The method as claimed in claim 1, wherein the running, by the MCU, the pre-silicon test program for testing the semiconductor device under test comprises employing, by the MCU, at least one testing platform, wherein the at least one testing platform comprises at least one of an ATE platform or a bench platform.

5. The method as claimed in claim 2, wherein in response to the running of the pre-silicon test program, the method comprises evaluating, by the MCU, the pre-silicon test program based on the plurality of test plan parameters comprising the one or more electrical parameters.

6. The method as claimed in claim 1, wherein the testing and debugging, by the MCU, the semiconductor device under test comprises validating, by the MCU, the semiconductor device under test using the emulation platform.

7. The method as claimed in claim 1, comprising optimizing, by the MCU, the pre-silicon test program with the bench board test program and the semiconductor device under test for reducing production test times and incorporating response times of the plurality of test plan parameters.

8. A system for creating and debugging a pre-silicon test program for a semiconductor device, comprising:
    a Micro Controller Unit (MCU); and
    a memory operatively coupled to the MCU, wherein the memory comprises MCU-executable instructions which, when executed by the MCU, cause the MCU to:
        run a pre-silicon test program for testing a semiconductor device under test based on a plurality of test plan parameters, wherein the pre-silicon test program is created in at least one of a hardware description language or a high-level programming language, and is tested and validated during a design and verification phase using simulations;
        convert the pre-silicon test program from the hardware description language to the high-level programming language in response to determining that the pre-silicon test program is created in the hardware description language;
        integrate the pre-silicon test program in the high-level programming language with at least one of a bench board test program or an automated test equipment (ATE) test program;

map one or more Application Programming Interface (API) resources available in the pre-silicon test program to one or more resources available in the bench board test program or the ATE test program during integration, wherein the mapping abstracts implementation specific API resources and methods to facilitate portability of the pre-silicon test program across different testing platforms; and test and debug the semiconductor device under test using an emulation platform in response to completion of mapping of the API resources using the bench board test program or the ATE test program.

9. The system as claimed in claim 8, comprising a Field Programmable Gate Array (FPGA) operatively coupled to the MCU for high-speed implementation and interfacing to one or more force blocks and one or more sense blocks.

10. The system as claimed in claim 9, wherein the one or more force blocks are coupled to the MCU with or without using the FPGA, and controlled for forcing at least one of a voltage source, a resistance, a capacitance, or a current source on one or more pins of the semiconductor device under test using one or more relay switches.

11. The system as claimed in claim 10, wherein the one or more sense blocks are coupled to the MCU with or without using the FPGA, and controlled for sensing an output on the one or more pins of the semiconductor device under test using the one or more relay switches, and wherein the sensing is performed through at least of an Analog-to-Digital Converter (ADC), one or more sensors, or one or more circuits using discrete components for sensing of voltage, current, frequency, time period, and temperature.

12. The system as claimed in claim 11, wherein the one or more relay switches are operatively coupled to the one or more force blocks and the one or more sense blocks for connecting to the semiconductor device under test.

13. The system as claimed in claim 9, wherein the memory comprises MCU-executable instructions which, when executed by the MCU, cause the MCU to run a characterization program for evaluating a performance and a quality of the semiconductor device under test, and perform a stress test or reliability related tests on the semiconductor device under test using the FPGA, the one or more force blocks, the one or more sense blocks, and one or more relay switches operatively coupled to the MCU.

14. The system as claimed in claim 8, wherein the MCU is to run the pre-silicon test program in the high-level programming language for testing the semiconductor device under test by being configured to employ at least one testing platform, wherein the at least one testing platform comprises at least one of an ATE platform or a bench platform.

15. The system as claimed in claim 8, wherein in response to the running of the pre-silicon test program, the MCU is to evaluate the pre-silicon test program based on the plurality of test plan parameters comprising one or more electrical parameters.

16. The system as claimed in claim 8, wherein the MCU is to test and debug the semiconductor device under test by being configured to validate the semiconductor device under test using the emulation platform.

17. The system as claimed in claim 9, wherein the memory comprises MCU-executable instructions which, when executed by the MCU, cause the MCU to optimize the pre-silicon test program in the high-level programming language with the bench board test program and the semiconductor device under test using the FPGA, the one or more force blocks, the one or more sense blocks, and one or more relay switches operatively coupled to the MCU.

* * * * *